United States Patent [19]

Friello et al.

[11] 4,100,301

[45] Jul. 11, 1978

[54] CHEWING GUM CONTAINING NON-DUSTING COLORS AND METHOD

[75] Inventors: Dominick R. Friello; Raymond L. Roy, both of Danbury, Conn.

[73] Assignee: Life Savers, Inc., New York, N.Y.

[21] Appl. No.: 723,430

[22] Filed: Sep. 16, 1976

[51] Int. Cl.² .............................................. A23G 3/30
[52] U.S. Cl. ........................................ 426/3; 426/250; 426/540; 426/548; 426/658
[58] Field of Search ........................................ 426/3–6, 426/250

[56] References Cited

U.S. PATENT DOCUMENTS 1,829,029  10/1931  Zimmerill .................................. 426/3
3,352,689  11/1967  Bilotti ........................................ 426/3

OTHER PUBLICATIONS

Lake Pigments, Warner Jenkinson Manufacturing Co., St. Lo. Mo. 1969, pp. 3, 9, 10, 13, 21.

*Primary Examiner*—Jeanette M. Hunter
*Attorney, Agent, or Firm*—Lawrence S. Levinson; Merle J. Smith; Burton Rodney

[57] ABSTRACT

A chewing gum is provided which contains non-dusting colorants in the form of lake colors dispersed in an animal or vegetable type fatty acid or oil vehicle substantially. The gum may also contain artificial sweetners thereof.

5 Claims, No Drawings

CHEWING GUM CONTAINING NON-DUSTING COLORS AND METHOD

The present invention relates to a colored chewing gum wherein the color is provided by a non-dusting type color composition.

Until now, in the coloring of chewing gum, fine particle-sized lake colors have been commonly employed. The lake colors provide the desired colors but because of their fugitive nature create a dust problem throughout the production area. The color dust may be found on personnel, equipment, floors and even in the surrounding atmosphere.

Accordingly, a technique for coloring chewing gum whereby sanitation is improved and dust problems are eliminated would be a well received advance in the art of coloring chewing gum products.

In accordance with the present invention, a colored chewing gum is provided wherein the colors are in the form of non-dusting free-flowing viscous liquid color dispersions which include FD&C lake colors dispersed in an animal or vegetable type fatty liquid vehicle.

In addition, in accordance with the present invention, a method for preparing colored chewing gum is provided wherein the dust problem created by the use of fine particle-sized lake colors is substantially eliminated so that cleanliness and sanitation in the processing and manufacturing areas are greatly improved. The method of the invention for forming colored chewing gum includes the steps of dispersing the non-dusting free-flowing viscous liquid color dispersion comprised of FD&C lake colors dispersed in an animal or vegetable type fatty liquid vehicle, in the gum base and thereafter adding to the gum base-color dispersion mixture the remaining chewing gum components, including corn syrup (or other plasticizers of softeners), sugar and/or other sweetening agents, flavors, fillers and other desired chewing gum ingredients.

Surprisingly, it has been found that in addition to its sanitary advantages, the use of the color dispersions described offers distinct uniformity in color and color intensity throughout the gum product with substantially no streaking. Furthermore, because the color dispersion is distributed throughout the gum base, it is not easily extracted in the mouth when the finished chewing gum product is chewed.

The non-dusting color dispersion employed herein in the form of a solid or semi-solid heated to its softening point, for example, 130° to 180° F, is preferably added to the gum base which is heated at a temperature within the range of from about 125° to about 250° F and more preferably at a temperature within the range of from about 170° to about 230° F. The upper limit of the latter temperature range will, of course, be below the decomposition or degradation temperature of the FD&C colors and the vehicles in which they are dispersed as well as the other components of the chewing gum product. The lower temperature limit will be governed by the degree of viscosity and flowability required of the liquid vehicle.

The actual amount of FD&C lake color dispersed in the liquid vehicle and the amount of FD&C lake color-liquid vehicle dispersion added to the gum base will be dependent upon intensity of color desired in the final product and the solubility of the color in the vehicle. Thus, in carrying out the method of the invention the level of usage of the FD&C lake color-liquid vehicle dispersion may vary from about 0.03 to about 3%, and preferably from about 0.05 to about 1% by weight of the finished gum formula or product.

As indicated, the non-dusting FD&C lake color-liquid vehicle dispersion will be added to the gum base and is thoroughly dispersed in and throughout the gum base employing suitable conventional mixing equipment such as a sigma-blade type mixer or other suitable mixer.

The liquid vehicle or carrier in which the FD&C lake color is dispersed can be any food grade animal or vegetable type fatty acid or oil such as hydrogenated vegetable oil, safflower oil, tallow, stearic acid, coconut oil, palm oil, peanut oil, soybean oil, or mixtures of vegetable oils and fatty acids with hydrogenated vegetable oil (for example, palm and coconut oils) being preferred.

The color chewing gum of the invention includes a relatively water-insoluble, water-impenetrable gum base in an amount ranging from about 8 to about 50%, and preferably from about 15 to 30% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

| Base I | Parts by Weight |
|---|---|
| Ester gum | 88 |
| Rubber latex solids | 10 |
| Lecithin | 2 |
| Base II | |
| Chicle | 30 |
| Jelutong | 60 |
| Gutta soh | 8.5 |
| Lecithin | 2 |
| Base III | Parts by Weight |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruits, may also be incorporated in the chewing gum with or without conventional preservatives.

The chewing gum will also include one or more sweeteners including natural sweeteners, such as natural sugar, and/or artificial sweeteners. Where a natural sweetener is employed, it may be present in an amount ranging from about 80 to about 0.05%, preferably from about 80 to about 40%, and more preferably from about 75 to about 50% by weight of the final product.

The term "natural sugar" includes sugar alcohols, such as xylitol, sorbitol or mannitol as well as one or more sugars or sugar containing material, for example, monosaccharides, disaccharides and polysaccharides, some examples of which follow:

A. Monosaccharides of 5 or 6 carbon atoms — arabinose, xylose, ribose, glucose, mannose, galactose, fructose, dextrose, or sorbose or mixtures of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

Examples of artificial sweeteners suitable for use herein include the free acid form of saccharin, the sodium, calcium and ammonium saccharin salts, dihydrochalcones, glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipity Berry), free cyclamic acid and cyclamate salts, and the like, or mixtures of any two or more of the above.

The artificial sweetener may be present in the chewing gum in amounts ranging from 0 to about 5%, and preferably from about 0.05 to about 1%.

The chewing gum will also contain plasticizers or softeners, such as corn syrup, sorbitol syrups, modified starches, ester gums and the like, other softeners, fillers, such as chalk, titanium dioxide and the like, and texturizers, such as hydrated alumina, other plasticizers, emulsifiers, and other conventional chewing gum additives as will be apparent to those skilled in the art.

The following Example represents a preferred embodiment and further illustrates the present invention without, however, limiting the same thereto. All temperatures are expressed in °F.

EXAMPLE

A cherry flavor saccharin-sugar containing chewing gum is prepared from the following ingredients:

| Ingredients | Parts by Weight |
| --- | --- |
| Gum Base | 20 |
| Sugar | 60 |
| Corn Syrup | 17 |
| Ester gums | 1.5 |
| Non-dusting color dispersion (14.5% FD&C Red lake #3 and 85.5% hydrogenated vegetable oil) | 0.07 |
| Artificial cherry flavor | 1.5 |

The gum base is melted at a temperature range of 175°–250° F and placed in a standard dough mixer kettle equipped with sigma blades. The non-dusting semi-solid color dispersion is added as a solid or semi-solid or may be heated to its softening point or at a temperature in the range of 150°–180° F and then added to the preheated gum base. After 3–7 minutes of mixing, sugar, ester gum and flavor and corn syrup are added and blended with the above mixture for 5 minutes at 120°–150° F. The resulting gum is discharged from the kettle and formed into sticks employing conventional techniques and then wrapped.

The chewing gum product obtained is found to have a uniform red color throughout without any streaking. In addition, the manufacturing area employed is substantially free of red color dust.

What is claimed is:

1. A colored chewing gum comprising gum base, flavor, and a non-toxic non-dusting colorant composition dispersed substantially uniformly in and throughout said gum base, said colorant composition comprising one or more FD&C lake colors dispersed in an animal or vegetable food grade fatty acid or oil, said colorant composition being present in an amount within the range of from about 0.03 to about 3% by weight of said colored chewing gum, said chewing gum being substantially uniform in color and color intensity throughout and substantially free of color streaking.

2. The colored chewing gum as defined in claim 1 wherein said colorant composition is present in an amount within the range of from about 0.05 to about 2% by weight of said colored chewing gum.

3. The colored chewing gum as defined in claim 1 wherein said animal or vegetable food grade fatty acid or oil is selected from the group consisting of hydrogenated vegetable oil, safflower oil, tallow, stearic acid, coconut oil, palm oil, peanut oil, soybean oil, and mixtures of vegetable oils and fatty acids.

4. The colored chewing gum as defined in claim 1 further including corn syrup, or sorbitol, mannitol or xylitol.

5. The colored chewing gum as defined in claim 1 wherein said flavor comprises a natural sweetener or an artificial sweetener.

* * * * *